US009254864B2

(12) United States Patent
Dzsudzsak

(10) Patent No.: US 9,254,864 B2
(45) Date of Patent: Feb. 9, 2016

(54) SAFETY CIRCUIT FOR AN ELECTRIC MOTOR OF AN ELECTROMECHANICAL STEERING SYSTEM

(75) Inventor: Gergely Dzsudzsak, Bak (HU)

(73) Assignee: ThyssenKrupp Presta AG, Eschen (LI)

( * ) Notice: Subject to any disclaimer, the term of this patent is extended or adjusted under 35 U.S.C. 154(b) by 461 days.

(21) Appl. No.: 13/816,547

(22) PCT Filed: Aug. 9, 2011

(86) PCT No.: PCT/EP2011/003979
§ 371 (c)(1),
(2), (4) Date: Feb. 12, 2013

(87) PCT Pub. No.: WO2012/031656
PCT Pub. Date: Mar. 15, 2012

(65) Prior Publication Data
US 2013/0140104 A1 Jun. 6, 2013

(30) Foreign Application Priority Data

Aug. 23, 2010 (DE) .......................... 10 2010 035 149

(51) Int. Cl.
*B60L 1/00* (2006.01)
*B60L 3/00* (2006.01)
(Continued)

(52) U.S. Cl.
CPC ............ *B62D 5/0484* (2013.01); *B62D 5/0487* (2013.01); *H02H 7/1225* (2013.01)

(58) Field of Classification Search
CPC .... B62D 5/0484; B62D 7/148; B62D 5/0463; B62D 5/0487; B62D 5/0481; B62D 5/046; B62D 7/159; B62D 5/008; B62D 6/008; B62D 5/0493; B62D 5/003; B62D 5/049; B62D 7/1581; B62D 15/025; B62D 5/001
USPC .......................................... 180/404; 307/10.1
See application file for complete search history.

(56) References Cited

U.S. PATENT DOCUMENTS 5,827,753 A * 10/1998 Huang et al. ..................... 438/24
6,272,410 B2 * 8/2001 Okanoue et al. ................ 701/42
(Continued)

FOREIGN PATENT DOCUMENTS

DE          10205963 A1    9/2003
DE     102004023713 A1   12/2004
(Continued)

OTHER PUBLICATIONS

International Preliminary Report on Patentability issued in International Application No. PCT/EP2011/003979, date of issuance Feb. 26, 2013.
(Continued)

*Primary Examiner* — Jared Fureman
*Assistant Examiner* — Esayas Yeshaw
(74) *Attorney, Agent, or Firm* — Panitch Schwarze Belisario & Nadel LLP

(57) ABSTRACT

The invention relates to a motor vehicle power steering mechanism having four groups of MOSFETs, in which with respect to the direct current voltage vehicle electrical system the MOSFETs of the first group (20) and of the second group (21) are arranged with their parasitic diodes in the reverse direction and the MOSFETs of the third group (31) and/or of the fourth group (30) are arranged with their parasitic diodes in the forward direction.

4 Claims, 6 Drawing Sheets

(51) Int. Cl.
    *H02G 3/00*     (2006.01)
    *B62D 5/04*     (2006.01)
    *H02H 7/122*     (2006.01)

(56) References Cited

U.S. PATENT DOCUMENTS

| | | | |
|---|---|---|---|
| 6,371,239 B2 * | 4/2002 | Furumi et al. | 180/445 |
| 6,731,081 B2 * | 5/2004 | Kusase et al. | 318/140 |
| 8,159,166 B2 * | 4/2012 | Koike | 318/400.21 |
| 2001/0027894 A1 * | 10/2001 | Noro et al. | 180/443 |
| 2012/0327547 A1 * | 12/2012 | Andersson et al. | 361/93.4 |
| 2013/0113405 A1 * | 5/2013 | Baranyai | 318/445 |

FOREIGN PATENT DOCUMENTS

| | | |
|---|---|---|
| DE | 102007024659 A1 | 11/2008 |
| DE | 102008000145 A1 | 7/2009 |
| EP | 0857135 B1 | 5/2002 |
| EP | 2112051 A1 | 10/2009 |
| WO | WO-03099632 A1 | 12/2003 |

OTHER PUBLICATIONS

International Search Report and Written Opinion issued in International Application No. PCT/EP2011/003979, mailed Nov. 30, 2011 with English translation of International Search Report.

* cited by examiner

SAFETY CIRCUIT FOR AN ELECTRIC MOTOR OF AN ELECTROMECHANICAL STEERING SYSTEM

CROSS-REFERENCE TO RELATED APPLICATIONS

This Application is a National Stage of PCT International Application No. PCT/EP2011/001979, filed on Aug. 9, 2011, and claims priority of German Patent Application No. 10 2010 035 149.0, filed on Aug. 23, 2010. The disclosures of the aforementioned applications are incorporated herein in their entirety by reference.

The present invention relates to an electromechanical power steering mechanism.

Electromechanical steering mechanisms usually have a permanently excited synchronous motor as the servomotor. Servomotors of this design are actuated by a controller via a set of MOSFETs, wherein with three phase windings six MOSFETs are provided in total. Each MOSFET switches the assigned phase winding to the on-board vehicle power-supply voltage or the earth potential. This occurs at a high frequency, so that the temporal average value acts as the effective voltage in the phase winding.

Permanently excited synchronous motors have the feature of producing a braking torque in the case of electrical faults such as, for example, in the case of short-circuits in the motor or in the actuation, so that such a fault can not only lead to a failure in the steering assistance but, as well, an additional resistance is opposed to the steering movement of the driver. For safety reasons, this cannot be tolerated in steering systems for motor vehicles.

In order to prevent this condition from occurring, it is known to separate the phase lines to the motor or in the neutral point of the motor. For this purpose, to some extent in the prior art electromechanical relays are proposed, which, however, mechanically for motor vehicle applications are not sufficiently robust and relatively expensive.

An electrical power steering mechanism for a vehicle is known from the publication EP 0 857 135 B1 and has an electric motor connected to a vehicle steering device via a transmission, wherein the electric motor is a brushless motor having a plurality of phase windings connected to a neutral point. Here, provision is made for a switching means to be arranged in at least two phases of the motor, this switching means being moveable between a closed position, in which current can flow in the phase winding, and an open position, which prevents current flowing in the respective phase winding of the motor. The switching means is arranged at the neutral point of the motor, so that the phase winding is separated from the neutral point when the switching means is opened. The switching means comprises a switch or a relay which is connected in series between one end of the phase winding and the driver circuit of the motor.

Technical solutions, which consist of semiconductors as switching means, are known, for example, from the publications DE 10 2004 023 713 A1, DE 10 2007 024 659 A1 and EP 2 112 051 A1. The publications show several exemplary embodiments with, in each case, six MOSFETs for actuating the windings and with further MOSFETs which are provided as safety switches between the driver circuit and the motor windings or between the supply lines of the on-board vehicle power-supply voltage and the driver circuits. In the event of an electrical disturbance, these safety switches are intended to separate the electrical connection between the driver circuit and the windings. The windings are not then short-circuited and cannot produce a braking torque.

The publication WO 03/099632 A1 shows various switches for an electric motor in a motor vehicle, in which in the event of a disturbance a braking torque is to be prevented or compensated. On the one hand, a Y connection is described having the above described properties and, on the other hand, more complex full bridge circuits are described.

Hence, it is the object of the present invention to specify a switch in an electrically assisted motor vehicle steering mechanism having an electric motor attached in Y connection, in which the MOSFETs provided as safety switches are supplied with a lower operating current and which, even in the event of failure of individual safety switches, still reliably separates the phase windings of the electric motor from one another.

This object is achieved in an electromechanical motor vehicle power steering mechanism, having a three-phase, permanently excited electric motor which can be operated via an electronic controller and feed lines from a direct current voltage motor vehicle electrical system, wherein the electric motor has at least three phase windings, which, on the one hand, are connected to one another at a neutral point in Y connection and, on the other hand, are connected to a driver circuit respectively via lines, wherein the driver circuit connects each of the lines via a first MOSFET respectively of a first group to the positive feed line and via a second MOSFET respectively of a second group to the negative feed line (connected to the negative pole or the earth of the motor vehicle) as a function of a controller, and wherein further MOSFETs are provided as safety switches, by providing the following features:

the further MOSFETs comprise in total six MOSFETs in a third group and a fourth group, wherein respectively one MOSFET of the first group is located in series with one MOSFET of the third group between the positive feed line and one of the lines to the phase windings and respectively one MOSFET of the second group is located in series with one MOSFET of the third group between the negative feed line and one of the lines to the phase windings, so that respectively two MOSFETs are arranged between each feed line and each of the lines leading to the phase windings, in each case at least one MOSFET and at most two MOSFETs of the four MOSFETs connected to a line is/are arranged with its/their parasitic diode(s) in the forward direction with respect to the direct current voltage vehicle electrical system and at least one of the diodes in one of the groups of MOSFETs is connected in the reverse direction.

In this way, in the case of a short-circuit between the positive and the negative feed lines and in the case of manual operation of the steering, an induction current, which brakes the manual operation or completely prevents it, can be prevented from flowing.

The invention is preferably applied to electric motors having exactly three phase windings.

Advantageous embodiments make provision with respect to the direct current voltage vehicle electrical system for the MOSFETs of the first group, of the second group and of the third group to be arranged with their parasitic diodes in the reverse direction and for the MOSFETs of the fourth group to be arranged with their parasitic diodes in the forward direction, or make provision with respect to the direct current voltage vehicle electrical system for the MOSFETs of the first group, of the second group and of the fourth group to be arranged with their parasitic diodes in the reverse direction and for the MOSFETs of the third group to be arranged with their parasitic diodes in the forward direction.

Provision can also be made with respect to the direct current voltage vehicle electrical system for the MOSFETs of the first group and of the second group to be arranged with their parasitic diodes in the reverse direction and for the MOSFETs of the third group and of the fourth group to be arranged with their parasitic diodes in the forward direction.

Exemplary embodiments of the present invention are described below with the aid of the drawings.

Figure 1:
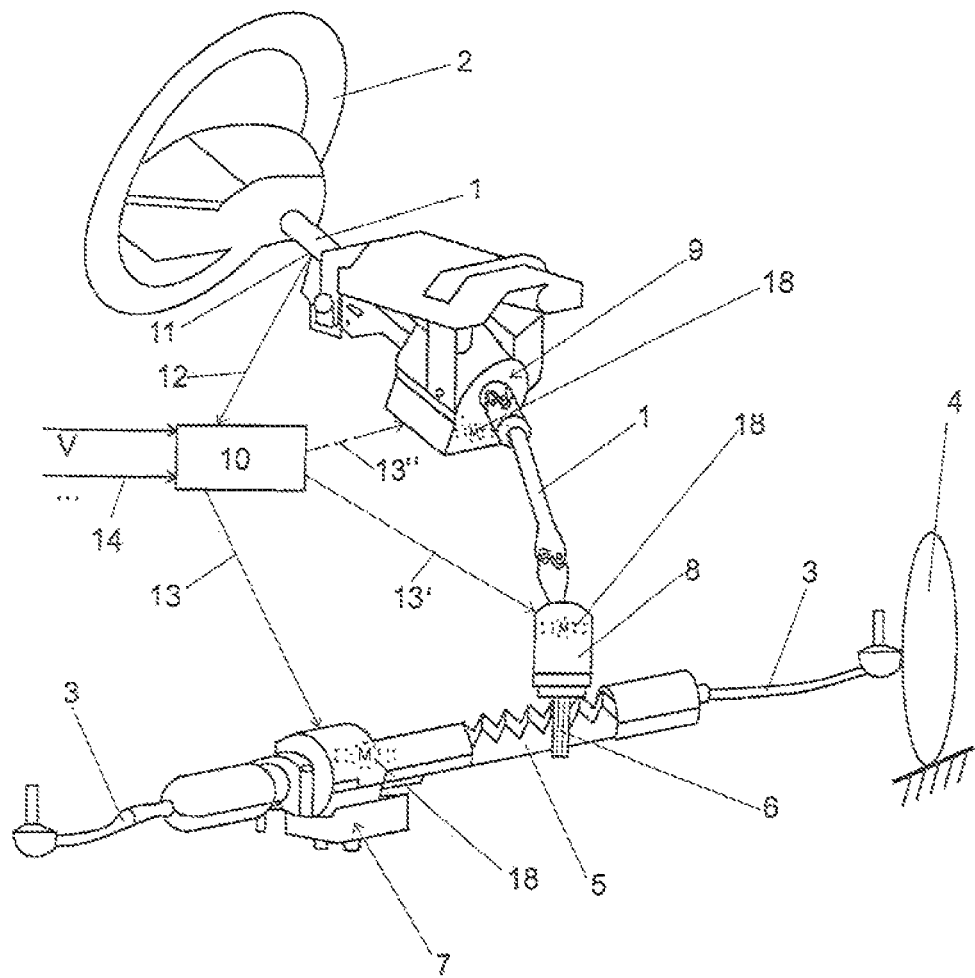
FIG. 1 shows an electromechanical power steering mechanism in a schematic illustration with several possibilities for arranging the servomotor.

In FIG. 1, an electromechanical power steering mechanism is schematically illustrated, wherein the illustration is intended to illustrate different embodiments.

A steering shaft 1 is connected to a steering wheel 2 for operation by the driver. Steering track rods 3 are connected in a known way to steered wheels 4 of the motor vehicle. A rotation of the steering shaft 1 causes an axial displacement of a steering rack 5 by means of a gear pinion 6 which is connected to the steering shaft 1 in a torque-proof manner.

The electromechanical power steering mechanism can have a motor housing 7 on the steering gear side, a motor housing 8 on the steering pinion side or a motor housing 9 on the steering column side. The present invention is not dependent on the specific design of the steering mechanism. The motor housings 7, 8 or 9 are connected to a controller 10 which, amongst other things, receives torque signals from a torque sensor 11 via a signal line 12 and sends the corresponding control signals via signal lines 13, 13' or 13" to the servo drive arranged in one of the housings 7, 8 or 9. The controller 10, itself, receives input signals such as, for example, the vehicle speed and via a supply line 14 the on-board power-supply voltage of the motor vehicle required for operation.

A servomotor 18 is provided in the housings 7, 8 or 9, which is ultimately actuated as a function of the input signals of the sensor 11 or the remaining input signals delivered by the vehicle. This design is known from the prior art.

In the present invention, the servomotors 18 are permanently excited synchronous motors. The controller 10 is constructed as an inverter with regard to actuating the phase windings of the servomotor 18. This circuit is illustrated in more detail in FIG. 2 below. In terms of the invention, the servo assistance can be understood as both a superposition of torques for reducing the torque to be applied by the driver during steering and a rotational angle superposition for superposing additional steering angles onto the steering angle introduced into the steering wheel 2 by the driver.

Figure 2:
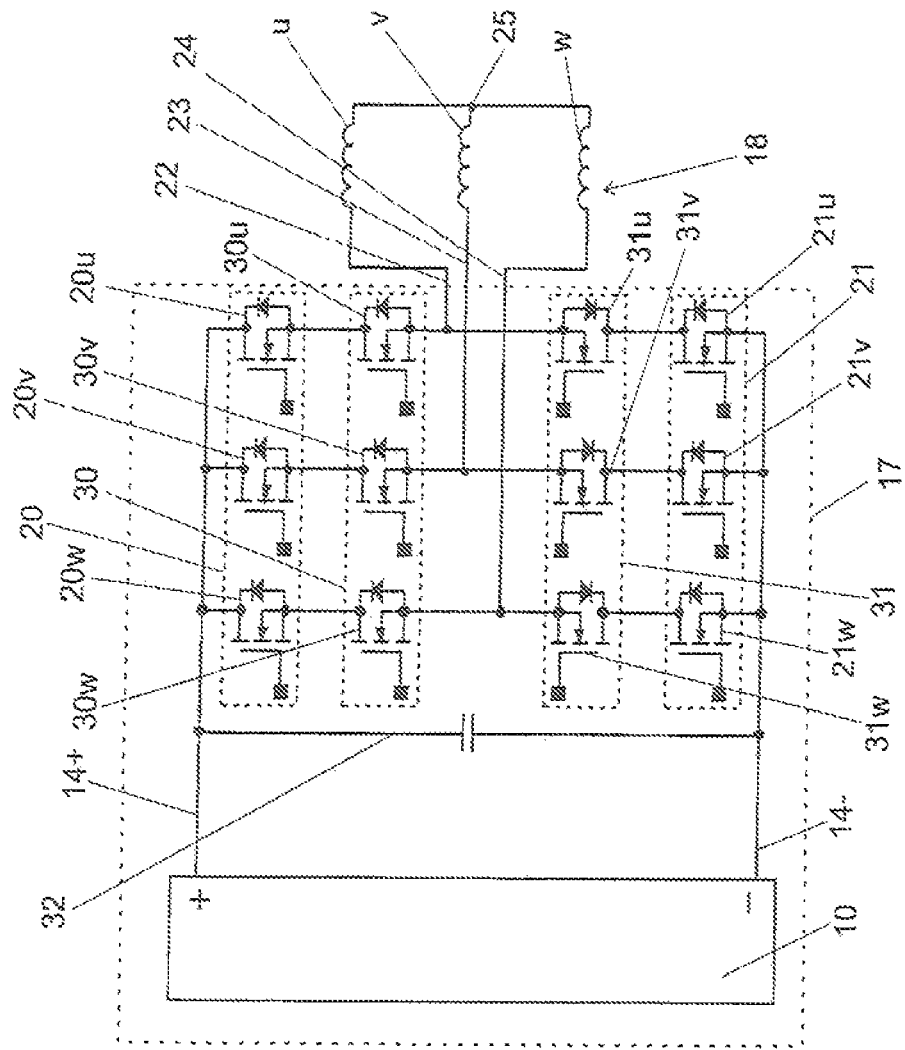
FIG. 2 shows a circuit for actuating a permanently excited synchronous motor having six MOSFETs for controlling the motor current and six safety switches designed as MOSFETs.

FIG. 2 shows the principal circuit of the power element of the controller 10. The supply line 14+ is connected to the positive pole of the supply line 14 and the supply line 14− is connected to the negative pole of the supply line 14 or to the earth connection of the on-board electrical system of the motor vehicle which functions in the normal manner using direct current with negative earth. A first group 20 comprises three MOSFETs 20u, 20v and 20w for applying the on-board vehicle power-supply voltage to the three phase windings u, v and w. A second group 21 of in total three further MOSFETs 21u, 21v and 21w is provided for applying the earth potential to the phase windings u, v and w. For this purpose, the two groups 20 and 21 feed in total three lines 22, 23 and 24. The phase windings u, v and w are connected to one another at a neutral point 25 in Y connection.

A third group 30 with three MOSFETs 30 u, 30 v and 30 w is connected in series to the first group 20. Here, the individual MOSFETs 30 u, 30 v and 30 w are oriented in such a way that their parasitic or intrinsic diodes point in the same direction as those of the first group of MOSFETs 20 u, 20 v and 20 w.

A fourth group 31 with three MOSFETs 31 u, 31 v and 31 w is connected in series to the second group 21. Here, the individual MOSFETs are oriented in such a way that their parasitic diodes are aligned opposite the parasitic diodes of the MOSFETs 21 u, 21 v and 21 w of the second group.

Finally, between the two supply lines 14+ and 14− a smoothing capacitor 32 is also provided which suppresses high-frequency feedback effects from the electric motor and the MOSFETs arranged in front of it.

The four groups of MOSFETs are actuated via the controller and the control lines 13 which are not illustrated in FIG. 2. To this end, the required control signals are applied to the control electrodes (gates) of the individual MOSFETs.

Specifically, the MOSFETs of the third group 30 and of the fourth group 31 are provided as safety switches. This means that in operation the individual MOSFETs of the groups 30 and 31 are permanently conductively connected as long as the steering device is active and no disturbance occurs.

The MOSFETs of the first group 20 and of the second group 21 are provided as drivers. These driver MOSFETs of the groups 20 and 21 are usually connected in such a way that their intrinsic or parasitic diodes are connected in the reverse direction with respect to the on-board vehicle power-supply voltage. As a function of the control signals, they connect the individual phase windings u, v and w either to the positive potential or to the earth potential. This takes place at high frequency, so that in the individual windings u, v and w the temporal average value is effective as the operating voltage for producing an assistance torque.

As was described in the introduction, an electrical disturbance in the controller or in the motor itself can lead to the phase windings being short-circuited and, during a steering movement which would then be carried out by the driver without servo assistance, to a braking torque resisting the steering movement through the induction current which forms in the windings. This is not to be allowed.

A disturbance can, for example, involve a short-circuit which occurs in the controller 10 or in the feed lines 14. For example, the smoothing capacitor 32 can develop a short-circuit, so that the two lines 14+ and 14− are electrically connected to one another. In this case, an induction voltage would form in the windings u, v and w during a rotation of the electric motor 18 forced by the external torque of the steering column. As long as the MOSFETs of the four groups 20, 21, 30 or 31 are conductive, induction currents can flow and impede the rotation of the electric motor 18. In this case, the MOSFETs of the third group 30 and fourth group 31 provided as safety switches are switched off. They become non-conductive, so that the windings u, v and w are no longer short-circuited. No induction current forms which could brake the motor 18.

Here, it is important that the MOSFETs of the fourth group 31 are oriented with their parasitic diodes opposing the MOSFETs of the second group 21. MOSFETs are also electrically conductive in the direction of the parasitic diode in the switched-off state, if namely an externally applied voltage is sufficiently high to make the diode conductive in the forward direction. Using the example of the two windings u and v, with a short-circuited smoothing capacitor 32 this would mean that the induction current flows out of the winding u via the line 22 through the MOSFET 20 u and the MOSFET 30 u to the smoothing capacitor 32 which is conductive. From there, the current can then flow further to the MOSFET 21 v. Since the MOSFET 31v, which would close via the line 23 to the winding v, is aligned opposite, here the parasitic diode is connected in the reverse direction. The electric circuit is interrupted here. No induction current flows. If the MOSFET 31 v were connected in the same direction as the MOSFET 21 v, then a current would also be able to flow here via the parasitic diode and the induction current which forms in the windings u and v could produce a braking torque. This would be just the case if the induced voltage in the windings u and v were higher than the sum of the voltages which the parasitic diodes of the MOSFETs require in order to be conductive in the forward direction.

In one exemplary embodiment, in which the parasitic diode of the MOSFET in each case has the band gap or the diffusion voltage of a silicon diode of 0.6 volts, in the case of a disturbance a circuit known from the prior art, in which all MOSFETs are arranged in the same direction, would become conductive from an induction voltage of 4×0.6 volts=2.4 volts. When this voltage was exceeded, the electric motor 18 would then be abruptly braked by the induction current which forms. With the circuit according to the invention according to FIG. 2, this effect cannot occur with the MOSFETs of the fourth group 31 being connected in an opposite direction, since the parasitic diodes of the fourth group 31 are connected in the reverse direction with respect to the rest of the MOSFETs of the other groups.

Figure 3:
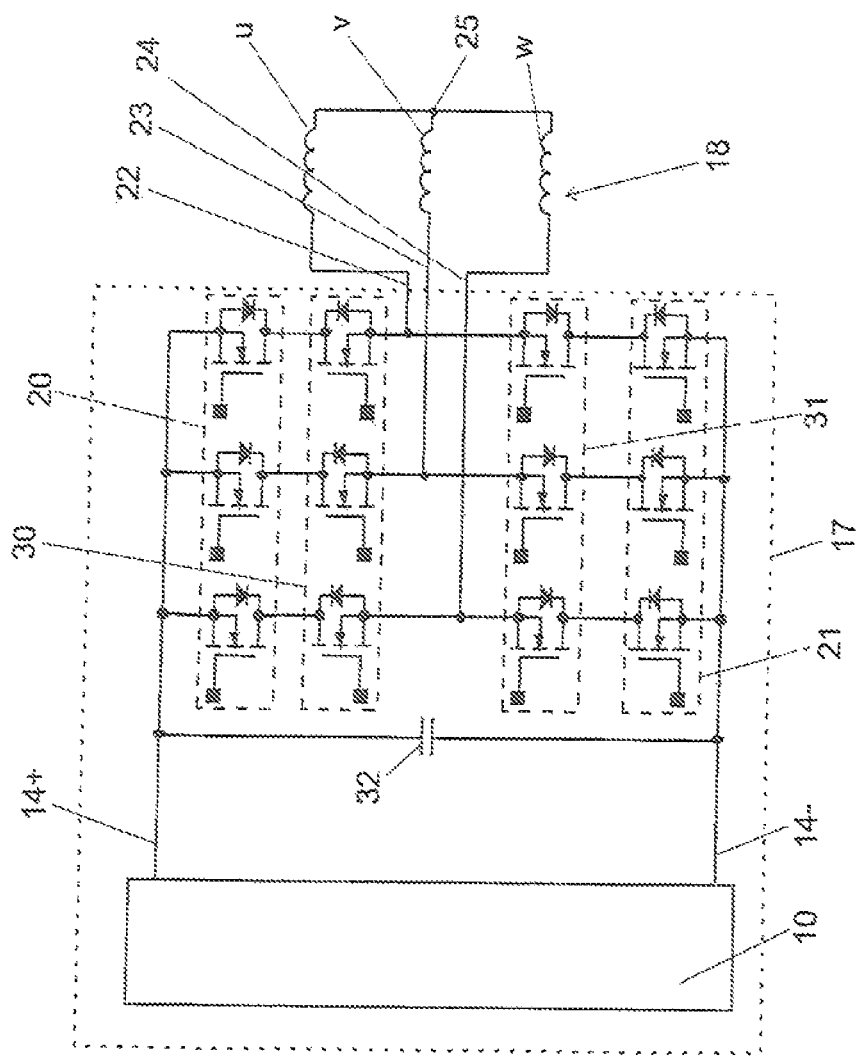
FIG. 3 shows a circuit as illustrated in FIG. 2 but with another arrangement of the safety switches designed as MOSFETs.

FIG. 3 shows a further exemplary embodiment of the present invention, in which for better clarity the reference numbers of the individual MOSFETs from FIG. 2 are not indicated. In other respects, the components which are the same or have the same effect have the same reference numbers.

In this exemplary embodiment, a fourth group 30' of MOSFETs, which in other respects corresponds to the fourth group 30 from FIG. 2 in function and arrangement, is connected in the opposite direction to the MOSFETs of the first group 20. In this way, as with the two lower groups 21 and 31, it is ensured that in each case two MOSFETs connected in series are joined up in circuit with parasitic diodes oriented in the opposite direction. A current flow in the case of low induction voltages is thus also already prevented here within this part of the circuit.

Figure 4:
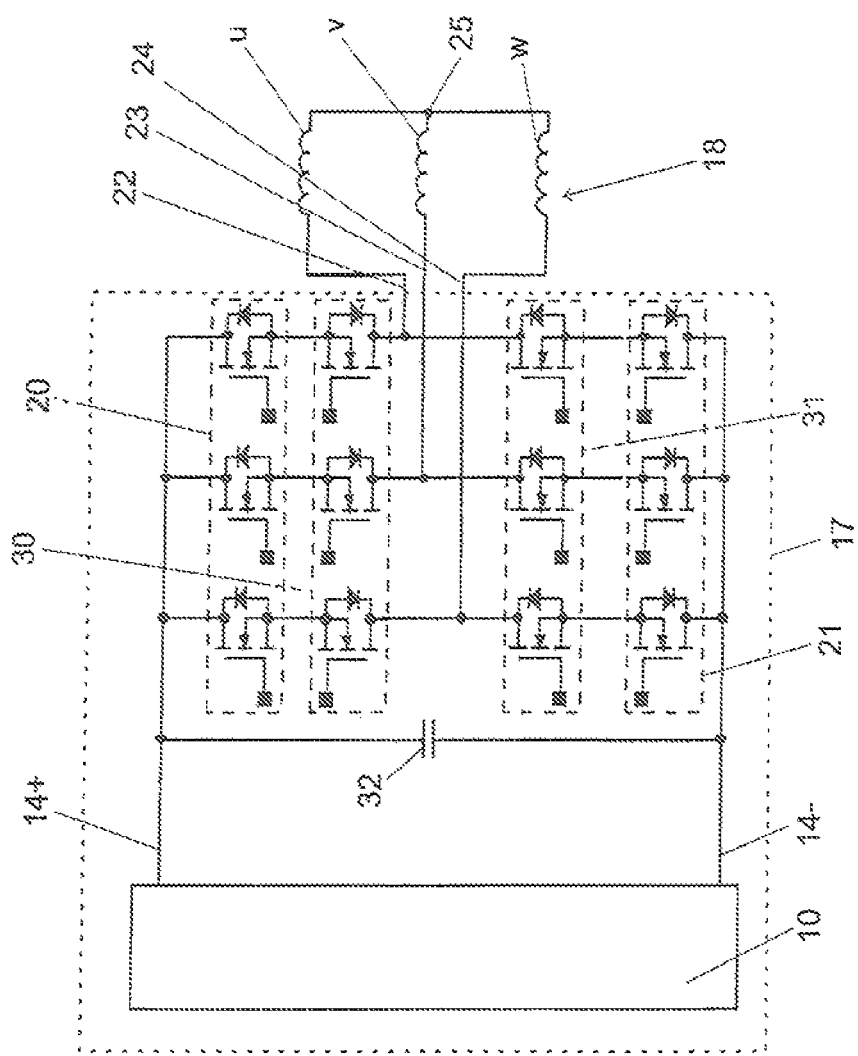
FIG. 4 shows a circuit as illustrated in FIG. 2 but with another arrangement of the safety switches designed as MOSFETs.

The effect corresponding to the invention can also be achieved with a circuit corresponding to FIG. 4. The circuit illustrated in FIG. 4 essentially corresponds to the circuit in FIG. 3. However, the directions of the parasitic diodes of the MOSFETs are exactly reversed, than with the circuit according to FIG. 3. Due to the series connection, it is not important for the invention whether the parasitic diode, which is electrically connected to the feed line 14+, 14−, or the parasitic diode, which is electrically connected to the phase winding 22, 23, 24, is connected in the reverse direction or in the forward direction. It is important that at least one of the diodes in one of the groups of MOSFETs 20, 30, 21, 31 is connected in the reverse direction and at least one of the diodes in one of the groups of MOSFETs 20, 30, 21, 31 is connected in the forward direction. In FIGS. 3 and 4, an advantageous configuration of the invention is illustrated, in which both in the leg which is connected to the positive feed line 14+ and in the leg which is connected to the negative feed line 14−, in each case one of the parasitic diodes is connected in the reverse direction and in each case one of the parasitic diodes is connected in the forward direction.

Figure 5:
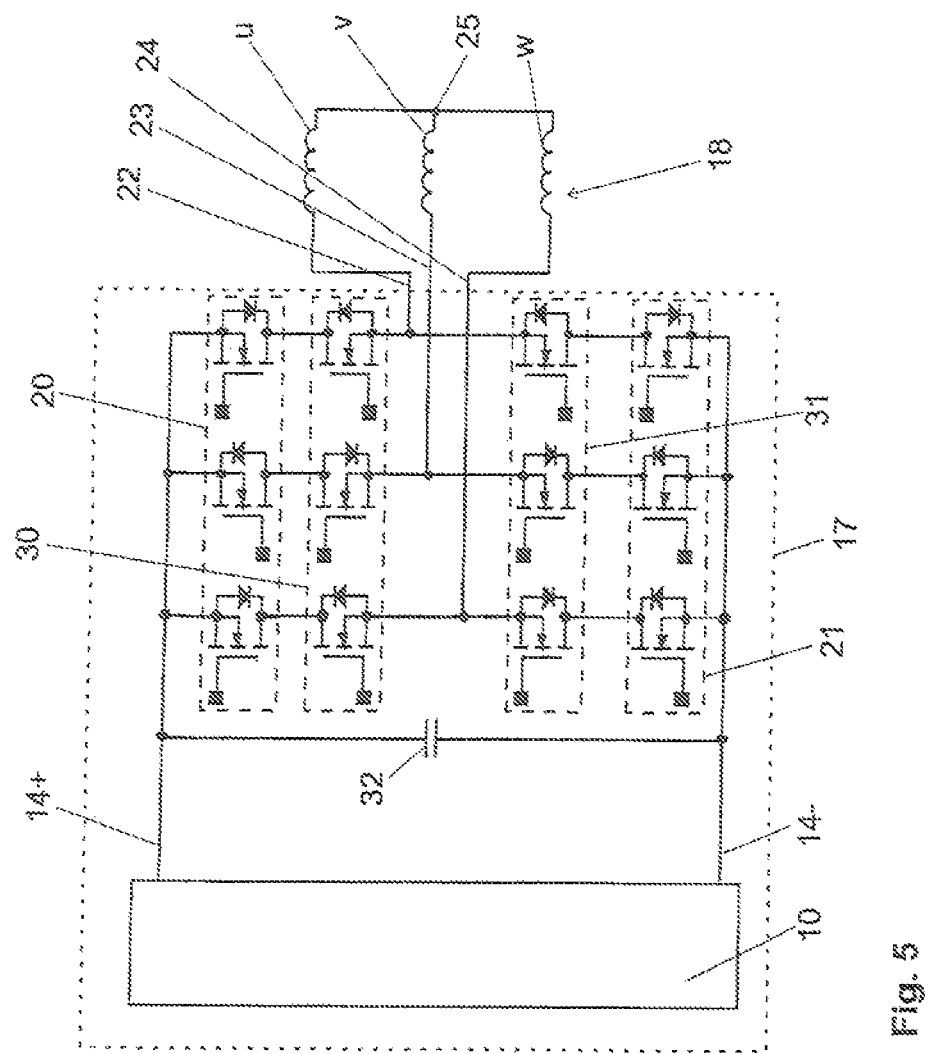
FIG. 5 shows a circuit as illustrated in FIG. 2 but with another arrangement of the safety switches designed as MOSFETs and FIG. 6 shows a circuit as illustrated in FIG. 2 but with another arrangement of the safety switches designed as MOSFETs.

In an alternative embodiment of the invention, it is also conceivable and possible to have different alignments of the parasitic diodes within the groups of MOSFETs 20, 30, 21, 31. This is illustrated in FIG. 5, by way of example. To illustrate the invention it is only vital, as already explained above, that at least one of the diodes in one of the groups of MOSFETs 20, 30, 21, 31 is connected in the reverse direction and that at least one of the diodes in one of the groups of MOSFETs 20, 30, 21, 31 is connected in the forward direction, in the electric circuit of the respective phase winding between the positive feed line 14+ and the negative feed line 14−.

Figure 6:
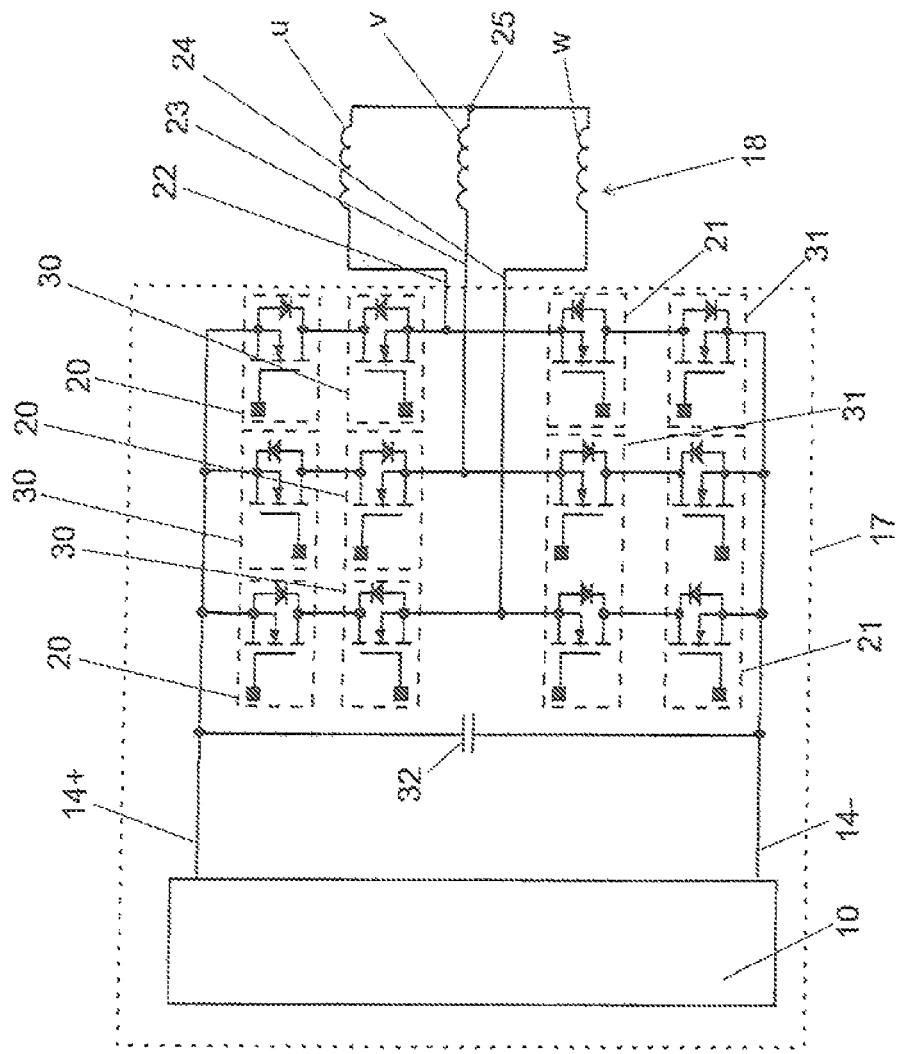

For the example corresponding to FIG. 2, it was explained that the first and second groups of MOSFETs 20, 21 are responsible for actuating the phase windings and the third and fourth groups of MOSFETs 30, 31 are responsible for the safety shutdown of the phase windings. The same allocation was provided for FIGS. 3, 4 and 5. It is, however, conceivable and possible, and incorporated within the scope of the invention, for the actuation of the phase windings to be carried out via the third and fourth groups of MOSFETs 30, 31 and for the safety shutdown to be produced by the first and second groups of MOSFETs 20, 21. It is even possible for each electric circuit to use between the positive feed line 14+ and one of the lines 22, 23, 24 of the phase windings and between the negative feed line 14− and one of the lines 22, 23, 24 of the phase windings an arbitrary MOSFET for the actuation and the other MOSFET as the safety switch. Care has to be taken, however, that in each case at least one arbitrary MOSFET is connected with its parasitic diode in the electric circuit between the respective lines 22, 23, 24 of the phase winding and the positive feed line 14+ or the negative feed line 14− and the respective lines 22, 23, 24 of the phase winding in the reverse direction and at least one arbitrary MOSFET is connected with the parasitic diode in the forward direction. The alignment of the diodes must not, therefore, be the same in the respective group of MOSFETs 20, 21, 30, 31. A circuit configuration of this type is illustrated in FIG. 6. Here, the groups of MOSFETs 20, 21, 30, 31 are specially arranged in the electric circuit for each phase, as is illustrated by the dashed borders around the MOSFETs with the identifiers 20, 21, 30, 31.

In principle, using comparable circuits, motors with another number of phase windings can also be actuated. The number of MOSFETs in the respective group of MOSFETs is then the same as the number of phase windings of the electric motor. In other words, for each phase winding two MOSFETs are to be arranged between the positive feed line 14+ and the line of the phase winding and two MOSFETs are to be arranged between the negative feed line 14− and the line of the phase winding. The invention is also applicable for these motors.

In summary, the advantages compared to the prior art are that with respect to circuits, in which the MOSFETs functioning as safety switches separate the connections between the drivers and the phase windings or between the phase windings and the neutral point, the safety switches of the groups 30 and 31 are only supplied with half the current, so that here more economically priced components can be used. The heat generated at the individual safety switches is less than in the prior art. With respect to the circuits, which are configured as full bridge circuits, the number of MOSFETs used is reduced. With respect to similar circuits, which also function with twelve MOSFETs, in which the individual MOSFETs, however, are connected in the same direction, operational safety is, for example in the described case of the short-circuited smoothing capacitor 32, considerably improved by the MOSFETs, which are joined up in circuit in the opposite direction, of the group 31 and, where applicable, also of the group 30'.

What is claimed is:

1. An electromechanical motor vehicle power steering mechanism, comprising:
    a three-phase, permanently excited electric motor including three phase windings connected to each other in a Y connection;
    an electronic controller electronically coupled to the electric motor;
    positive and negative feed lines from a direct current voltage motor vehicle electrical system and electronically coupled to the electronic controller;
    a driver circuit coupled via respective connecting lines to the three phase windings of the electric motor, wherein the driver circuit is configured to connect each of the connecting lines via a respective first MOSFET of a first group to the positive feed line and via a respective second MOSFET of a second group to the negative feed line as a function of the controller; and
    safety switches comprising six further MOSFETs disposed in a third group and a fourth group, wherein one respective MOSFET of the first group is located in series with one respective MOSFET of the third group between the positive feed line and one of the connecting lines to the phase windings, and one respective MOSFET of the second group is located in series with one respective MOSFET of the third group between the negative feed line and one of the connecting lines to the phase windings, so that two respective MOSFETs are arranged between each respective feed line and each of the respective connecting lines leading to the phase windings,
    wherein, in each case, at least one MOSFET of the four MOSFETs connected to a respective connecting line is arranged with a parasitic diode of the at least one MOSFET in the forward direction with respect to the direct current voltage vehicle electrical system, and wherein at least one diode of the groups of MOSFETs is connected in a reverse direction.

2. The electromechanical motor vehicle power steering mechanism according to claim 1, wherein, with respect to the direct current voltage vehicle electrical system, the MOSFETs of the first group, of the second group and of the third group are arranged with parasitic diodes in a reverse direction, and wherein the MOSFETs of the fourth group are arranged with parasitic diodes in a forward direction.

3. The electromechanical motor vehicle power steering mechanism according to claim 1, wherein, with respect to the direct current voltage vehicle electrical system, the MOSFETs of the first group, of the second group and of the fourth group are arranged with parasitic diodes in a reverse direction, and wherein the MOSFETs of the third group are arranged with parasitic diodes in a forward direction.

4. The electromechanical motor vehicle power steering mechanism according to claim 1, wherein, with respect to the direct current voltage vehicle electrical system, the MOSFETs of the first group and of the second group are arranged with parasitic diodes in a reverse direction, and wherein the MOSFETs of the third group and of the fourth group are arranged with parasitic diodes in a forward direction.

* * * * *